United States Patent [19]
Mori

[11] Patent Number: 4,998,201
[45] Date of Patent: Mar. 5, 1991

[54] FOUR WHEEL STEERING CONTROL SYSTEM FOR VEHICLES

[75] Inventor: Kazunori Mori, Ebina, Japan

[73] Assignee: Nissan Motor Co., Ltd., Japan

[21] Appl. No.: 314,874

[22] Filed: Feb. 24, 1989

[30] Foreign Application Priority Data

Feb. 24, 1988 [JP] Japan ................... 63-39716

[51] Int. Cl.$^5$ ............................................. B62D 5/04
[52] U.S. Cl. .............................. 364/424.05; 180/140; 280/91
[58] Field of Search .................. 364/424.05; 280/91; 180/140–142

[56] References Cited

U.S. PATENT DOCUMENTS

| | | | |
|---|---|---|---|
| 4,705,131 | 11/1987 | Shibata et al. | 180/140 |
| 4,706,771 | 11/1987 | Kawabe et al. | 180/142 |
| 4,706,979 | 11/1987 | Kawabe et al. | 280/91 |
| 4,753,308 | 6/1988 | Noto et al. | 180/79.1 |
| 4,770,265 | 9/1988 | Allen | 180/140 |
| 4,773,012 | 9/1988 | Ito et al. | 364/424.01 |
| 4,840,389 | 6/1989 | Kawabe et al. | 280/91 |
| 4,872,116 | 10/1989 | Ito et al. | 364/424.05 |

OTHER PUBLICATIONS

"4WS (Four Wheel Steering) Vehicle: The Front Line of Active Control Techniqnes" Active Seigyo Gijutsu no Saizensen, Symposium, Society of Automotive Engineers of Japan, 1987.

*Primary Examiner*—Thomas G. Black
*Attorney, Agent, or Firm*—Leydig, Voit & Mayer

[57] ABSTRACT

A four wheel steering control system for a vehicle includes a steering wheel angle sensor, a vehicle speed sensor, and a controller for determining auxiliary front and rear wheel steer angles $\delta_f$ and $\delta_r$ with respect to a basic front wheel steer angle $\delta_o$ proportional to a steering wheel angle $\theta$ in accordance with the following transfer functions:

$$\frac{\delta_f(s)}{\delta_o(s)} = (K_f \cdot s + T_f) \cdot \frac{\phi(s)}{\theta(s)} - 1$$

$$\frac{\delta_r(s)}{\delta_o(s)} = (K_r \cdot s + T_r) \cdot \frac{\phi(s)}{\theta(s)}$$

where s is a Laplace transform variable, and $K_f$, $K_r$, $T_f$ and $T_r$ are constant determined by the vehicle speed and the specifications of the vehicle.

6 Claims, 4 Drawing Sheets

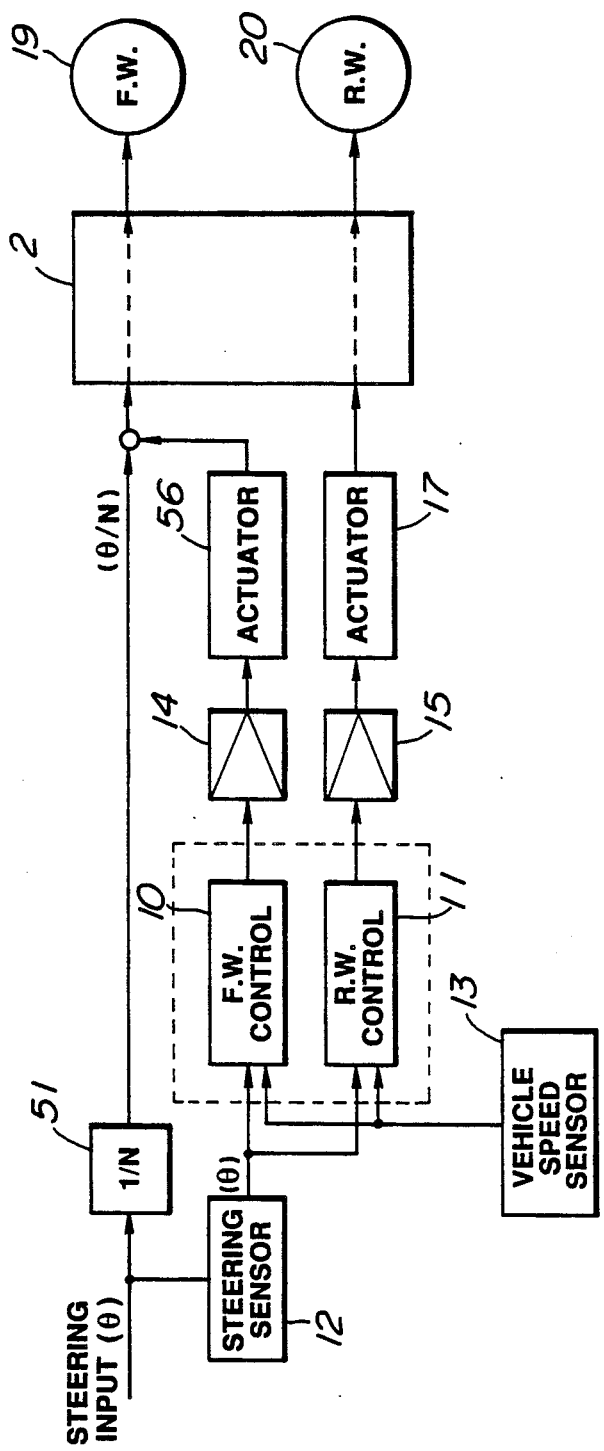

FOUR WHEEL STEERING CONTROL SYSTEM FOR VEHICLES

BACKGROUND OF THE INVENTION

This invention relates to a four wheel steering control system for a vehicle. A conventional four wheel steer angle control system is disclosed in an article by Tanaka et al. entitled "Mazda Shasoku Kannougata Yonrinsoda," (Mazda vehicle speed sensing type four wheel steering) 4WS (Yonrinsoda) sha: Active Seigyo Gijutsu no Saizensen, Symposium, Society of Automotive Engineers of JAPAN, 1987. In this conventional system, the ratio of a rear wheel steer angle to a front wheel steer angle is constant provided that the vehicle speed is constant. Therefore, this conventional system can improve the vehicle stability during a steady state turning motion, but the improvements in vehicle response characteristic are insufficient especially during an abrupt steering operation such as in an emergency, and in a dynamic steering operation such as during travel along a slalom course.

There has been proposed a steer angle control system having a vehicle speed sensor, a steering wheel angle sensor, and a controller for controlling an auxiliary rear wheel steer angle $\delta_r(s)$ with respect to a front wheel steer angle $\delta_0(s)$ in accordance with $$\frac{\delta_r(s)}{\delta_0(s)} = \frac{K + T1\,s}{1 + T2\,s}$$

where K, T1, and T2 are control constants. This control system can improve the steering response characteristics and stability of the vehicle.

However, this control system controls only the rear wheel steer angle by controlling a zero side slip angle position in accordance with the vehicle speed. Therefore, the steady state yaw rate gain is uniquely determined, and the flexibility in design of vehicle characteristics is limited. This control system cannot provide a desired yaw rate frequency response.

SUMMARY OF THE INVENTION

It is an object of the present invention to provide a vehicle steer angle control system which can provide a desired yaw rate frequency response and provided greater flexibility in designing the vehicle dynamic characteristics.

According to the present invention, a four wheel steering control system comprises front actuator means, rear actuator means, first and second sensor means, and controller means. The front actuator means steers the front wheels of a vehicle in response to a front control signal representing a controlled front wheel steer angle. The rear actuator means steers the rear wheels of the vehicle in response to a rear control signal representing a controlled rear wheel steer angle. The first sensor means senses a steering wheel angle of the vehicle, and the second sensor means senses the speed of the vehicle. The controller means is connected with the first and second sensor means for producing the front and rear control signals in accordance with a first transfer function of the controlled front wheel steer angle with respect to a basic front wheel steer angle, and a second transfer function of the controlled rear wheel steer angle with respect to the basic front wheel steer angle. The first and second transfer functions are;

$$\frac{\delta_f(s)}{\delta_0(s)} = (K_f \cdot s + T_f) \cdot \frac{\dot{\phi}(s)}{\theta(s)} - 1$$

$$\frac{\delta_r(s)}{\delta_0(s)} = (K_r \cdot s + T_r) \cdot \frac{\dot{\phi}(s)}{\theta(s)}$$

where, $\delta_f(s)$ is the Laplace transform of the controlled front wheel steer angle $\delta_f$, $\delta_r(s)$ is the Laplace transform of the controlled rear wheel steer angle $\delta_r$, $\delta_0(s)$ in the Laplace transform of the basic front wheel steer angle, $\theta(s)$ is the Laplace transform of the steering wheel angle $\theta$, s is a Laplace transform variable, $K_f$, $K_r$, $T_f$ and $T_r$ are parameters whose values are fixed by the vehicle speed, and $\dot{\phi}(s)/\theta(s)$ is a predetermined yaw rate characteristic.

The controller means may comprise front controlling means having the first transfer function, rear controlling means having the second transfer functions, setting means for setting the desired yaw rate characteristic, and adjusting means for adjusting the parameters appearing in the transfer functions in accordance with at least one of the vehicle speed, the steering wheel angle, and the time rate of change of the steering wheel angle.

BRIEF DESCRIPTION OF THE DRAWINGS

FIG. 4 is a block diagram of a four wheel steering control system according to another embodiment of the present invention.

DETAILED DESCRIPTION OF THE INVENTION

Figure 1:
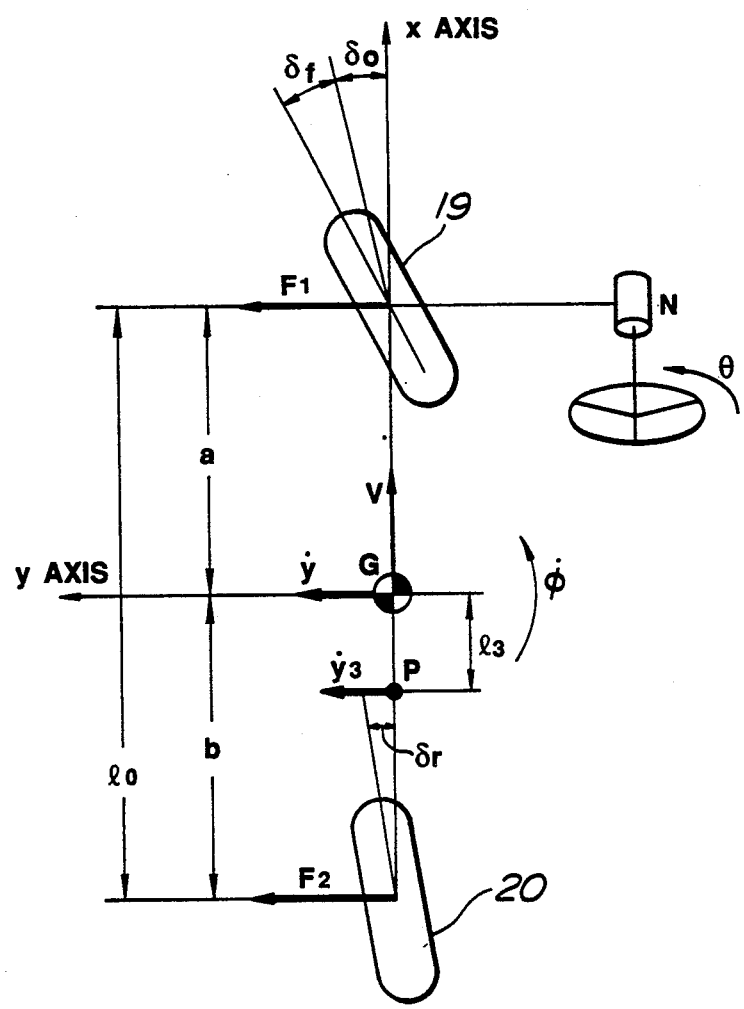
FIG. 1 is a plan view of a simplified vehicle model for illustrating quantities used in the present invention.

FIG. 1 is a plan view of a simplified vehicle model for illustrating the present invention. This vehicle model has a front wheel 19, a rear wheel 20 and a steering wheel 32. The center of gravity of the vehicle lies at point G.

In FIG. 1, various vehicle constants (specifications) and motion variables are denoted by the following reference letters.

M: vehicle mass
I: yawing moment of inertia
$l_0$: wheelbase
a: distance between the center of gravity G of the vehicle and the center of the front wheel 19
b: distance between the center of gravity G of the vehicle and the center of the rear wheel 20
$l_3$: distance between the center of gravity G of the vehicle, and a point P on the vehicle at which the side slip angle of the vehicle body is zero (The distance $l_3$ is positive when measured from the center of gravity g toward the rear wheel 20.)
$F_1$: front wheel side force (for two wheels)
$F_2$: rear wheel side force (for two wheels)
$C_1$: front wheel cornering power (for two wheels)
$C_2$: rear wheel cornering force (for two wheels)
V: vehicle velocity
$\dot{y}$: vehicle side velocity
$\dot{\phi}$: vehicle yaw rate
N: steering gear ratio
S: Laplace transform variable $\phi$: steering wheel angle In the linear, two-degree-of-freedom model shown in FIG. 1, the equations of vehicle motion are expressed using Laplace transforms as follows:

$$M(s\dot{y} + V\dot{\phi}) = F_1 + F_2 \tag{1}$$

$$Is\dot{\phi} = aF_1 - bF_2 \tag{2}$$

where $\delta_0$ is a basic front wheel steer angle given by $\delta_0 = \phi/N$, $\delta_f$ is an auxiliary front wheel steer angle, and $\delta_r$ is an auxiliary rear wheel steer angle. In these equations of motion $$F_1 = C_1\left(\delta_0 + \delta_f - \frac{\dot{y} + a\dot{\phi}}{V}\right) \tag{3}$$

$$F_2 = C_2\left(\delta_r - \frac{\dot{y} - b\dot{\phi}}{V}\right) \tag{4}$$

As shown in FIG. 1, $\dot{y}_3$ is the lateral velocity at point P which is at a distance $l_3$ from the center of gravity $G_4$ in the direction toward the rear of the vehicle. The lateral velocity $y_3$ is given by $$\dot{y}_3 = \dot{y} - l_3\dot{\phi} \tag{5}$$

The side slip angle $\beta_3$ of the vehicle body at point P is given by $$\beta_3 \approx \dot{y}_3/V \tag{6}$$

Therefore, $\beta_3$ becomes equal to zero when $\dot{y}_3$ is equal to zero. By substituting $\dot{y}_3=0$ into equation (5), we can obtain $$\dot{y} = l_3\dot{\phi} \tag{7}$$

Substitution of equation (7) into equations (1)–(4) yields;

$$Ml_3\dot{\phi}s + MV\dot{\phi} = F_1 + F_2 \tag{8}$$

$$Is\dot{\phi} = aF_1 - bF_2 \tag{9}$$

$$F_1 = C_1\left\{\delta_0 + \delta_f - \frac{\dot{\phi}}{V}(a + l_3)\right\} \tag{10}$$

$$F_2 = C_2\left\{\delta_r - \frac{\dot{\phi}}{V}(l_3 - b)\right\} \tag{11}$$

By using matrices, equations (8)–(11) are rewritten as follows:

$$\begin{bmatrix} M(l_3s + V) + \frac{C_1(a + l_3) + C_2(l_3 - b)}{V} \\ Is + \frac{C_1(a + l_3) - bC_2(l_3 - b)}{V} \end{bmatrix} \frac{\dot{\phi}}{\delta_0} = \begin{bmatrix} C_1 & C_2 \\ aC_1 & -bC_2 \end{bmatrix} \begin{bmatrix} 1 + \frac{\delta_f}{\delta_0} \\ \frac{\delta_r}{\delta_0} \end{bmatrix} \tag{12}$$

If the matrix on the left side of equation (12) is denoted by B and the first matrix on the right side of equation (12) is denoted by A, then equation (12) can be rewritten as follows:

$$\begin{bmatrix} 1 + \frac{\delta_f}{\delta_0} \\ \frac{\delta_r}{\delta_0} \end{bmatrix} = A^{-1} \cdot B \cdot \frac{\dot{\phi}}{\delta_0} = \frac{\tilde{A}}{|A|} \cdot B \cdot \frac{\dot{\phi}}{\delta_0} \tag{13}$$

In this equation, $|A|$ is the determinant of A, and $\tilde{A}$ is a cofactor matrix of A.

$$|A| = bC_1C_2 - aC_1C_2 = -l_0C_1C_2 \tag{14}$$

$$\tilde{A} = \begin{bmatrix} -bC_2 & -C_2 \\ -aC_1 & C_1 \end{bmatrix} \tag{15}$$

Substitution of equations (14) and (15) into equation (13) gives $$\begin{bmatrix} \frac{\delta_f}{\delta_0} \\ \frac{\delta_r}{\delta_0} \end{bmatrix} = \frac{1}{C_1C_2l_0}\begin{bmatrix} -bC_2 & -C_2 \\ -aC_1 & C_1 \end{bmatrix} \cdot \begin{bmatrix} M(l_3s + V) + \frac{C_1(a + l_3) + C_2(l_3 - b)}{V} \\ Is + \frac{aC_1(a + l_3) - bC_2(l_3 - b)}{V} \end{bmatrix} \cdot \frac{\dot{\phi}}{\delta_0} - \begin{bmatrix} 1 \\ 0 \end{bmatrix} \tag{16}$$

By using $\delta_f(s) = H(s) \cdot \delta_0(s)$, and $\delta_r(s) = G(s) \cdot \delta_0(s)$ in equation (16) we can obtain the following transfer functions H(s) and G(s) wherein $\delta_0(s)$ is the Laplace transform of the basic front wheel steer angle;

$$H(s) = \frac{\delta_f(s)}{\delta_0(s)} = \frac{(Mbl_3 + I)Vs + MbV^2 + C_1l_0(a + l_3)}{C_1l_0V} \cdot \frac{\dot{\phi}(s)}{\delta_0(s)} - 1 \tag{17}$$

$$G(s) = \frac{\delta_r(s)}{\delta_0(s)} = \frac{(Mal_3 + I)Vs + MaV^2 + C_2l_0(l_3 - b)}{C_2l_0V} \cdot \frac{\dot{\phi}(s)}{\delta_0(s)} \tag{18}$$

Equations (17) and (18) can be generalized as follows:

$$\frac{\delta_f(s)}{\delta_0(s)} = (K_f \cdot s + T_f) \cdot \frac{\dot{\phi}(s)}{\theta(s)} - 1 \tag{19}$$

$$\frac{\delta_r(s)}{\delta_0(s)} = (K_r \cdot s + T_r) \cdot \frac{\dot{\phi}(s)}{\theta(s)} \tag{20}$$

In equations (19) and (20), $K_f$, $K_r$, $T_f$ and $T_r$ are constants whose values are determined by the vehicle speed and the vehicle parameters (specifications) such as M, I, $l_0$, a, b etc. The vehicle parameters are regarded as constants in solving these equations.

The present invention is based on the transfer functions expressed by equations (17) and (18) or the generalized forms in equations (19) and (20). A steer angle control system of the invention is arranged to determine the auxiliary front and rear wheel steer angles "delta sub f" and "delta sub r" in accordance with these transfer functions by using the desired distance $l_3$ and the desired yaw rate characteristic $\dot{\phi}(S)/\phi(S)$ which are preliminarily determined so as to achieve a desired goal. Therefore, the control system can set the zero side slip angle position at a desired position, and obtain a desired yaw rate frequency response Thus, the present invention can provide ideal vehicle dynamic characteristics and steering stability.

Figure 2:
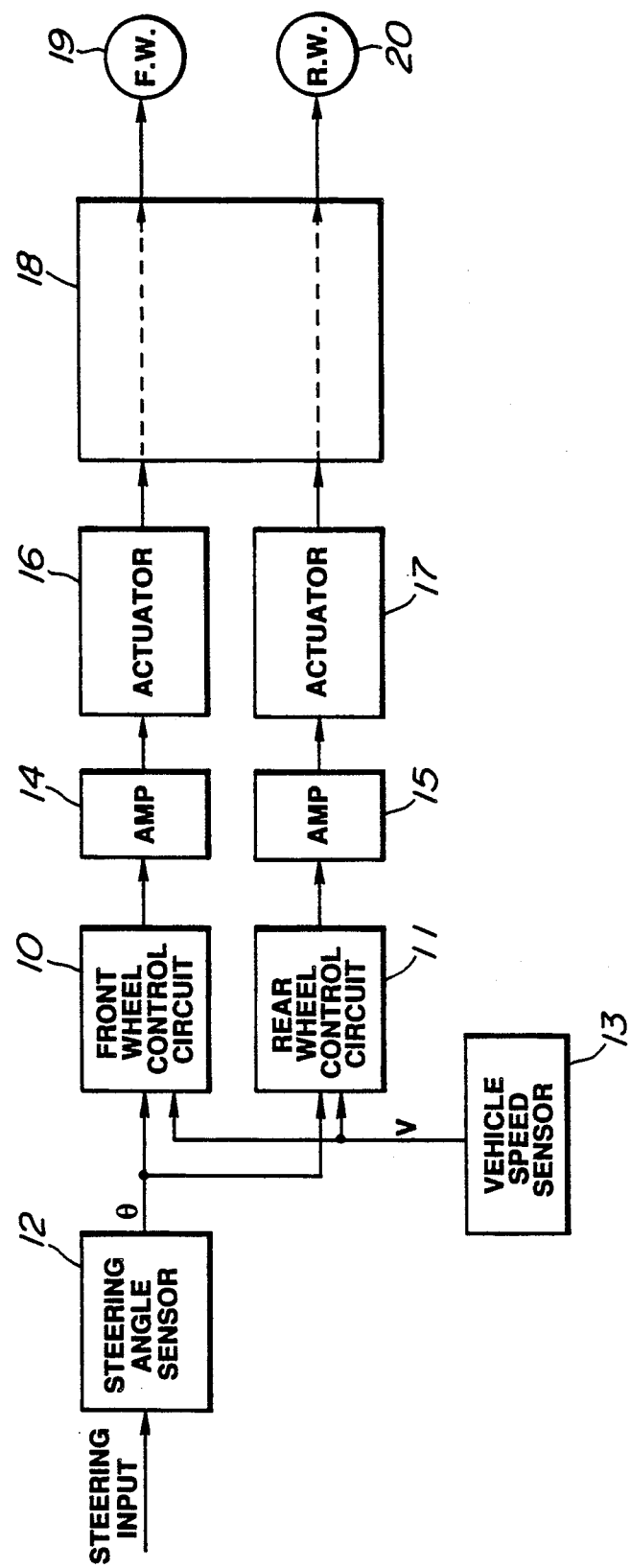
FIG. 2 is a block diagram of a four wheel steering control system according to one embodiment of the present invention.
Figure 3:
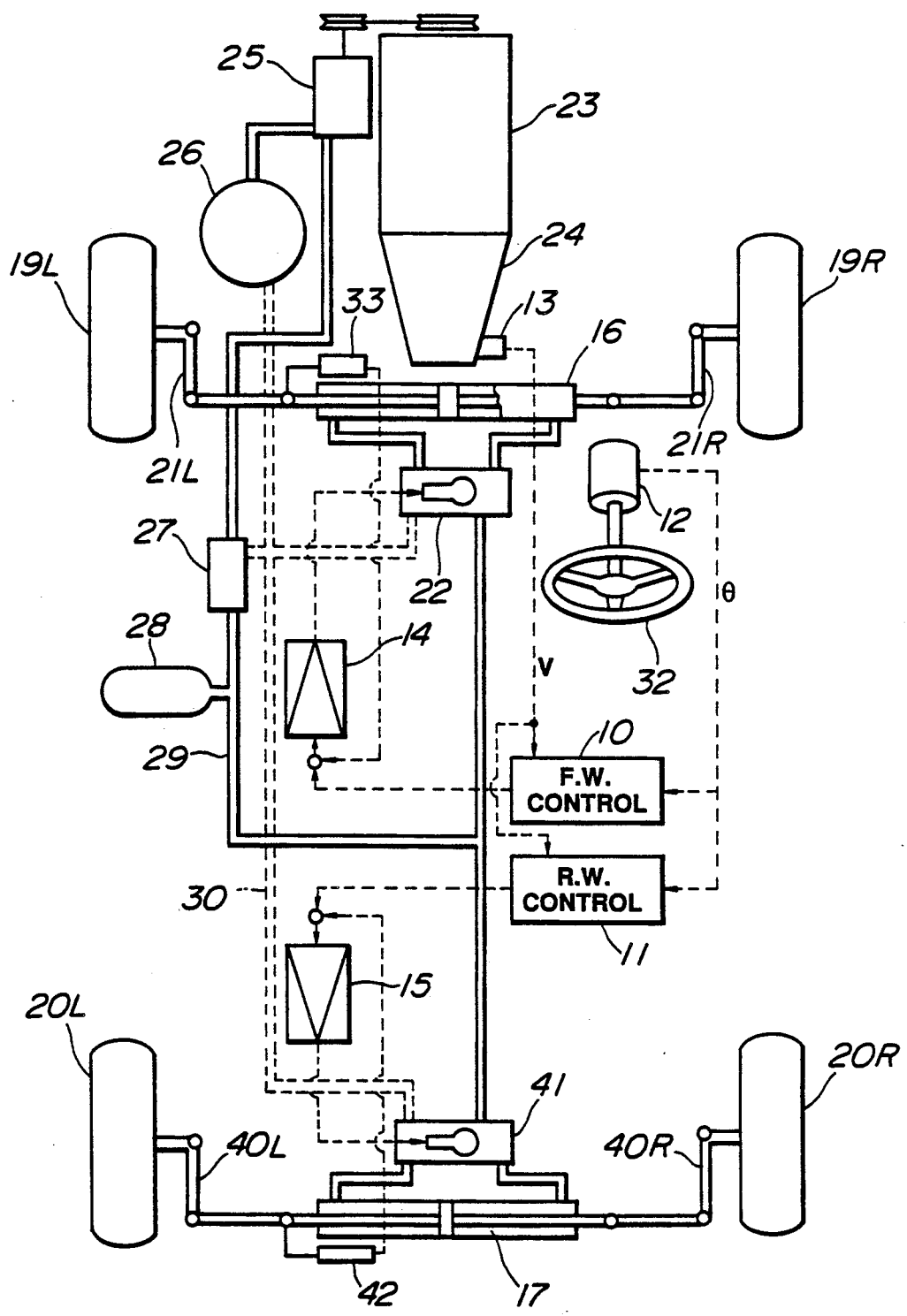
FIG. 3 is a schematic view of a four wheel steering vehicle equipped with the control system of FIG. 2.

FIGS. 2 and 3 show a control system of one embodiment of the present invention.

The control system shown in FIG. 2 includes a controller having a front wheel steer angle control section or circuit 10, and a rear wheel steer angle control section or circuit 11, each of which is connected with a steering angle sensor 12 for sensing a steering input $\phi$, and a vehicle speed sensor 13 for sensing a vehicle velocity V. The steering angle sensor 12 of this embodiment is a steering wheel angle sensor for sensing the steering wheel angle, and the steering input $\phi$ is the steering wheel angle. The front and rear control sections 10 and 11 determine, respectively, target front and rear wheel steer angles $\delta_f$ and $\delta_r$ in accordance with the transfer functions of equations (17) and (18) by using the steering wheel angle $\theta$ and the vehicle speed V. Front and rear control signals representing the thus-determined target front and rear wheel steer angles are sent from the front and rear control sections 10 and 11 to amplifiers 14 and 15, and amplified there. Then, the amplified front and rear control signals are supplied to front and rear steering actuators 16 and 17. In response to the front and rear control signals, the front and rear actuators 16 and 17 steer the front and rear wheels through the target steer angles $\delta_f$ and $\delta_r$, respectively.

The actuators 16 and 17 of this embodiment are shown in FIG. 3. The left and right front wheels 19L and 19R are connected with left and right front steering linkages 21L and 21R. The front steering actuator 16 is connected between the left and right steering linkages 21L and 21R. The front actuator 16 of this embodiment is a double acting hydraulic actuator. The stroke of the actuator 16 is controlled by a servo valve 22.

The vehicle has an engine 23 and a transmission 24. An oil pump 25 is driven by the engine 23. The oil pump 25 sucks oil from an oil reservoir 26, and discharges the oil to an unload valve 27, which controls the oil pressure at a predetermined value and supplies the pressurized oil to an accumulator 28. The oil is supplied from the accumulator 28 to the servo valve 22 through a supply passage 29. A return passage 30 conveys unnecessary oil from the servo valve 22 and the unload valve 27.

The servo valve 22 is controlled by the front control signal sent from the front control section 10 through the amplifier 14, and operates the front actuator 16 in response to the front control signal. In this embodiment, the vehicle speed sensor 13 is arranged to sense the output speed of the transmission 24.

In response to the front control signal of the front control section 10, the servo valve 22 supplies the oil of the supply passage 29 to one of two power chambers of the actuator 16 and makes the other chamber open to the return passage 30, so that the piston of the actuator 16 moves and steers the front wheels 19L and 19R. A front steer angle sensor 33 senses the steering amount produced by the front actuator 16. An output signal of the front steer angle sensor 33 is compared with the front control signal of the control circuit 10, and the servo valve 22 stops its control when the difference between both signals is reduced to zero. In this state, the servo valve 22 shuts off the both chambers of the actuator 16 from both of the supply and return passages 29 and 30, and the desired front wheel steer angle is achieved.

The rear wheels 20L and 20R are connected with left and right steering linkages 40L and 40R. The rear steering actuator 17 is connected between the left and right rear steering linkages 40L and 40R Thus, the rear steering actuator 17 can steer the rear wheels 20L and 20R.

The actuator 17 is controlled by a rear servo valve 41, which is connected with the hydraulic circuit 25-30 In response to the rear control signal of the rear control circuit 11, the rear actuator 17 and the rear servo valve 41 steer the rear wheels 20L and 20R in the same manner as the front actuator and servo valve 16 and 22. The steering direction and steering amount of the rear wheels are determined by the rear control signal of the rear control circuit 11. A rear wheel steer angle sensor 42 senses the rear wheel steer angle. The rear servo valve 41 stops the operation when the rear wheel steer angle sensed by the sensor 42 becomes equal to the steer angle represented by the rear control signal.

FIG. 4 shows another embodiment of the present invention. The rear wheel steering system of FIG. 4 is substantially the same as that of the embodiment shown in FIG. 2. In the embodiment of FIG. 4, the front wheels 19 are steered first through a mechanical steering gear 51, and secondarily through an auxiliary front steering actuator 56. The front actuator 56 of this embodiment is connected with the steering gear 51 as shown in FIGS. 7 and 8 or in FIG. 11 of the above-mentioned U.S. Pat. No. 4,705,131. These figures and the related explanation of the auxiliary front wheel steering actuator are herein incorporated by reference. In this embodiment, the basic front wheel steer angle is produced by the steering gear 51, and this basic front wheel steer angle $\delta_0$ is equal to $\theta/N$ where N is a steering gear ratio. The auxiliary front wheel steer angle $\delta_f$ is produced by the front actuator 56. The actual front wheel steer angle becomes equal to the sum of the basic front wheel steer angle $\delta_0$ and the auxiliary front wheel steer angle $\delta_f$. In this embodiment, the controlled front wheel steer angle is the auxiliary front wheel steer angle.

In the present invention, it is possible to further provide, in the controller unit, an adjusting section for varying the third distance $l_3$ of the zero side slip angle position P in accordance with one or more of the vehicle speed V, the steering wheel angle $\theta$ and the time rate of change of the steering wheel angle. Therefore, the adjusting section may be connected with the vehicle speed sensor or the steering angle sensor or a differentiator for determining the time rate of change of the steering wheel angle. The adjusting section is further connected with the front and rear control sections.

What is claimed is:

1. A four wheel steering control system comprising:
   front actuator means for steering the front wheels of a vehicle in response to a front control signal representing a controlled front wheel steer angle;
   rear actuator means for steering the rear wheels of said vehicle in response to a rear control signal representing a controlled rear wheel steer angle;
   first sensor means for sensing a steering wheel angle of said vehicle;
   second sensor means for sensing the speed of said vehicle; and controller means connected with said first and second sensor means for producing said front and rear control signals in accordance with a first and a second transfer function which are expressed as:

$$\frac{\delta_f(s)}{\delta_o(s)} = (K_f \cdot s + T_f) \cdot \frac{\dot{\phi}(s)}{\Theta(s)} - 1$$

$$\frac{\delta_r(s)}{\delta_o(s)} = (K_r \cdot s + T_r) \cdot \frac{\dot{\phi}(s)}{\Theta(s)}$$

where $\delta_f(s)$ is the Laplace transform of said controlled front wheel steer angle $\delta_f$, $\delta_r(s)$ is the Laplace transform of said controlled rear wheel steer angle $\delta_r$, $\Theta(s)$ is the Laplace transform of said steering wheel angle $\Theta$, $\delta_o(s)$ is the Laplace transform of a basic front wheel steer angle that is proportional to said steering wheel angle s is a Laplace transform variable, $K_f$, $K_r$, $T_f$ and $T_f$ are parameters whose values are fixed by said vehicle speed, and $\dot{\phi}(s)/\Theta(s)$ is a predetermined yaw rate characteristic.

2. A control system according to claim 1 wherein said vehicle includes a steering gear having a front wheel steering linkage and said front actuator means is connected with said front wheel steering linkage in such a manner that an actual front wheel steer angle is made equal to the sum of said basic front wheel steer angle determined by said steering gear and said controlled front wheel steer angle determined by said front actuator means.

3. A control system according to claim 2 wherein said controller means further comprises setting means connected with said front and rear controlling means for setting said desired yaw rate characteristic.

4. A four wheel steering control system comprising:
front actuator means for steering the front wheels of a vehicle in response to a front control signal representing a controlled front wheel steer angle;
rear actuator means for steering the rear wheels of said vehicle in response to a rear control signal representing a controlled rear wheel steer angle;
first sensor means for sensing a steering wheel angle of said vehicle;
second sensor means for sensing the speed of said vehicle; and
controller means connected with said first and second sensor means for producing said front and rear control signals and comprising first controlling means for determining said controlled front wheel steer angle in accordance with a first transfer function and rear controlling means for determining said controlled rear wheel steer angle in accordance with a second transfer function, said first and second transfer functions being expressed as $$\frac{\delta_f(s)}{\delta_o(s)} = \frac{\{(Mbl_3 + I)Vs + MbV^2 + C_1l_0(a + l_3)\}N}{C_1l_0V} \cdot \frac{\dot{\phi}(s)}{\Theta(s)} - 1$$

$$\frac{\delta_r(s)}{\delta_o(s)} = \frac{\{(Mal_3 - I)Vs + MaV^2 + C_2l_0(l_3 - b)\}N}{C_2l_0V} \cdot \frac{\dot{\phi}(s)}{\Theta(s)}$$

where
$\delta_f(s)$ is the Laplace transform of said controlled front wheel steer angle $\delta_f$,
$\delta_r(s)$ is the Laplace transform of said controlled rear wheel steer angle $\delta_r$,
$\Theta(s)$ is the Laplace transform of said steering wheel angle $\Theta$,
$\delta_o(s)$ is the Laplace transform of a basic front wheel steer angle of said vehicle,
s is a Laplace transform variable,
$\dot{\phi}(s)/\Theta(s)$ is a predetermined yaw rate characteristic,
M is the mass of said vehicle,
I is the yawing moment of inertia of said vehicle,
$l_0$ is the wheelbase of said vehicle,
a is the distance between the center of gravity of said vehicle and the position of said front wheels,
b is the distance between said center of gravity and the position of said rear wheels,
$l_3$ is a quantity representing the distance between said center of gravity and a zero side slip angle position at which a vehicle side slip angle is zero,
$C_1$ is a front wheel cornering power,
$C_2$ is a rear wheel concerning power, and V is said vehicle speed, and
N is a steering ratio.

5. A control system according to claim 4 wherein said vehicle includes a steering gear having a front wheel steering linkage, and said front actuator means is connected with said front wheel steering linkage in such a manner that an actual front wheel steer angle is made equal to the sum of said basic front wheel steer angle determined by said steering gear and said controlled front wheel steer angle determined by said front actuator means.

6. A control system according to claim 5 wherein said controller means further comprises setting means connected with said front and rear controlling means for setting said desired yaw rate characteristic.

* * * * *

UNITED STATES PATENT AND TRADEMARK OFFICE
CERTIFICATE OF CORRECTION

PATENT NO. : 4,998,201

DATED : March 5, 1991

INVENTOR(S) : Kazunori Mori

It is certified that error appears in the above-identified patent and that said Letters Patent is hereby corrected as shown below:

Column 7, line 13, change "$\delta_f(s)$" (second occurrence) to --$\delta_r(s)$--;

line 14, change "$\delta_f(s)$" (second occurrence) to --$\delta_r(s)$--;

line 17, after "angle" (second occurrence) insert --,--;

line 18, change "$K_f$" (second occurrence) to --$K_r$--;

line 18, change "$T_f$" (second occurrence) to --$T_r$--.

Column 8, line 17, change "$\delta_f$" to --$\delta_r$--;

line 36, change "concerning" to --cornering--.

Signed and Sealed this

Twentieth Day of October, 1992

*Attest:*

DOUGLAS B. COMER

*Attesting Officer*      *Acting Commissioner of Patents and Trademarks*